United States Patent [19]

Elkin et al.

[11] Patent Number: 5,263,806
[45] Date of Patent: Nov. 23, 1993

[54] MOBILE FEEDER LOADER AND METHOD

[76] Inventors: Benjamin T. Elkin; Benjamin T. Elkin, Jr.; Brent T. Elkin; Braden T. Elkin; Brian T. Elkin, all of 1200 Olson Rd., Marion Center, Pa. 15759

[21] Appl. No.: 724,797

[22] Filed: Jul. 2, 1991

[51] Int. Cl.⁵ .............................................. E02F 1/00
[52] U.S. Cl. ................................ 414/398; 198/522; 198/836.1; 414/528
[58] Field of Search .............. 414/346, 349, 350, 398, 414/523, 528, 574; 198/304, 308.1, 522, 836.1, 850, 851, 841, 832, 833

[56] References Cited

U.S. PATENT DOCUMENTS

| | | | |
|---|---|---|---|
| 710,902 | 10/1902 | Smith et al. | 414/398 |
| 1,477,776 | 12/1923 | Shedenhelm | 198/522 X |
| 2,194,144 | 3/1940 | Gill | 414/398 X |
| 2,458,031 | 1/1949 | Rome | 414/523 X |
| 2,868,356 | 1/1959 | Haaff | 198/833 |
| 2,907,481 | 10/1959 | Russell | 414/398 |
| 3,593,864 | 7/1971 | Moser | 414/528 |
| 3,876,089 | 4/1975 | Moser | 414/528 |
| 4,011,936 | 3/1977 | Hall | 198/522 X |
| 4,055,265 | 10/1977 | Elsenman | 414/528 X |
| 4,377,365 | 3/1983 | Layh | 414/528 X |
| 4,669,674 | 6/1987 | Oldengott et al. | 414/574 X |
| 4,697,696 | 10/1987 | Howe et al. | 198/851 X |
| 4,781,466 | 11/1988 | Zimmerman | 414/528 X |
| 4,887,539 | 12/1989 | Magaldi | 198/850 X |
| 4,948,299 | 8/1990 | Cronk, Jr. et al. | 198/522 X |
| 5,015,120 | 5/1991 | Brock et al. | 414/528 X |

FOREIGN PATENT DOCUMENTS 2821674 11/1979 Fed. Rep. of Germany ...... 414/574

OTHER PUBLICATIONS

Brochure of Torgeson 48"-50' Magnum Feeder, 4 pages, representing machine believed to be in existence prior to present invention.

Brochure of Caterpillar Track Shoes and Hardware, 4 pages, believed to be representative of devices in existence to prior to present invention.

Primary Examiner—Michael S. Huppert
Assistant Examiner—James T. Eller, Jr.

[57] ABSTRACT

An apparatus and method for loading overburden and ore into rock trucks that includes pushing the material onto an oscillating feed table that then feeds the material onto an inclined conveyor having an endless belt made of a series of overlapping rigid flights.

5 Claims, 7 Drawing Sheets

MOBILE FEEDER LOADER AND METHOD

This invention relates to an apparatus and method for taking heavy and large quantities of material such as the overburden of strip mines and conveying into a truck or other transportation receiver to remove the material.

One of the most common arrangements for moving large quantities of heavy material such as the overburden for strip mines, earth from excavations for dams and highways, and other similar material movement is to load large trucks by means of a front end loader or the use of large electric or hydraulic shovels.

The present invention is an improved arrangement where an apparatus is used that is mounted on a mobile base that has a feed station into which a bulldozer can push its entire load or several loads and the feed station oscillates to feed the load onto an inclined conveyor which elevates the heavy and large quantities of material, which can include large boulders, to dump into a rock truck to be hauled to a remote location. The inclined conveyor has a continuous conveyor that is transversely rigid to convey the material upward. The inclined conveyor forms the bottom of a trough having outwardly inclined sidewalls. The edge of the conveyor is under the sidewalls which have removable wear plates and the sidewalls diverge slightly as the material is conveyed upward which helps decrease the power needed to drive the unit.

The conveyor is made of a series of overlapping rigid plates which push and carry the material upward but because of their relatively flat profile can slide under the material to help take inertia shock loading as the conveyor is started when fully loaded. As the conveyor turns around the end drive sprockets at the top, the rigid plates in the conveyor separate slightly to permit any debris caught between the overlaps to fall loose.

The feed station includes a oscillating feed plate which moves back and forth under two rigid sidewalls. Moveable bulkheads on each side of the feed station helps gather and feed the material on the feed plate in a manner that causes it to move to a notched opening in the center of the feed plate which overlies the bottom of the conveyor. When a bulldozer pushes a fresh load of material onto the feed plate, the material pushes the moveable bulkheads upward on the feed plate, which is inclined. The bulkheads then return by gravity.

A common practice is to push material with bulldozers down to a front end loader (FEL) to help the FEL achieve full bucket capacity. Using the mobile feeder loader to load rock trucks versus using a front end loader enables the bulldozer to push the material to be loaded directly onto the feeder conveyor itself which loads directly onto the trucks. This avoids such problems as traction of the FEL in wet weather and freezing conditions especially in the wintertime when mud may freeze in the bucket of the loader. In many cases a bulldozer will be working on a grade and the bulldozer utilizes the slope of the grade itself to help push the material to be loaded downhill onto the feeder conveyor. The expectations are that trucks may be loaded in approximately twenty seconds, but certainly less than one minute, versus a normal four pass loading with front end loaders that have a probable cycle time of three to three and one-half minutes to load the truck. Using the present invention, trucks effectively get in, get loaded and get back on the way which is what the truck is built to do.

The feeder conveyor would normally be used for moving overburden in strip mining. First, the topsoil is removed to a location where it can be returned to provide for topsoil to reclaim the site when the coal has been removed from the strip mine. Next, the overburden under the topsoil is removed which will also be returned after the coal has been taken from the ground. The overburden usually involves a drilling and blasting operation. In the eastern coal fields the coal seams to be mined are on the order of 20 inches to 50 inches thick as the thicker seams have usually already been strip mined. The overburden may be in a ratio of 12 to 17, meaning that 12 to 17 cubic yards of overburden must be removed for each cubic yard of coal available. The invention is especially usable under these circumstances but is also usable in other applications where larger volumes of material must be moved, such as a dam project or a road project cutting through a mountain and similar applications.

DESCRIPTION OF THE PREFERRED EMBODIMENT

In this description, including the accompanying drawing, there is shown and described a preferred embodiment of the invention. It is to be understood that changes and modifications can be made in the preferred embodiment within the scope of the invention and that others skilled in the art will be able to modify it and embody it in a variety of forms, each as may be suited in the conditions of a particular case.

DETAILED DESCRIPTION OF THE INVENTION

Figure 1:
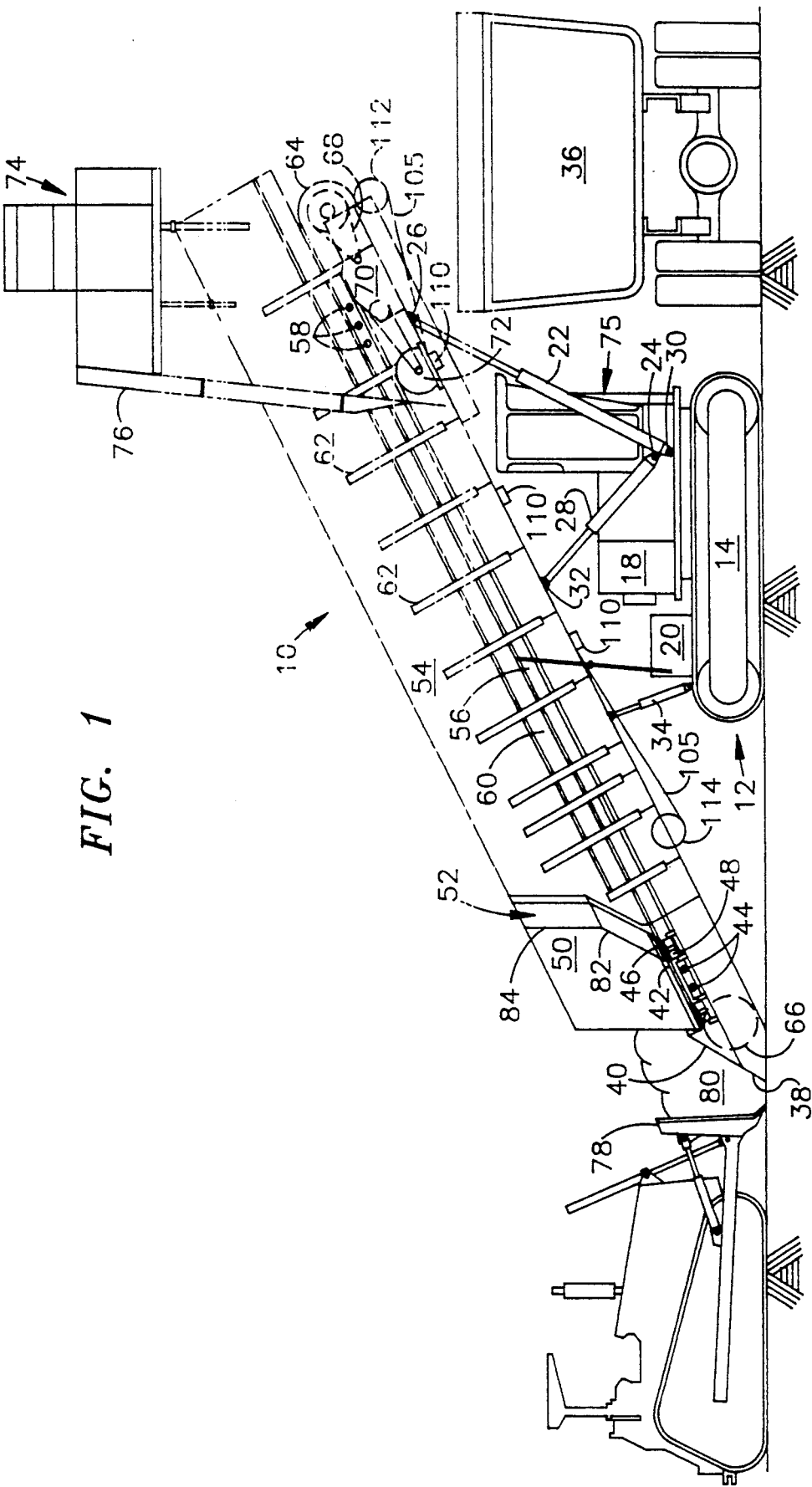
FIG. 1 is a side elevational schematic view of the invention.

With reference to FIG. 1, there is shown an overall side view of the mobile feeder loader 10 of the present invention. These machines are very large with the preferred embodiment shown in FIG. 1 being approximately 50 feet long and having a width of approximately 22 feet at 45 inches of height.

The feeder loader 10 has a self-propelled mobile base 12 which preferably comprises a propelling mechanism such as two track crawlers which are hydraulically driven. These crawlers are available from a number of manufacturers with the one on the preferred embodiment being a Komatsu PC400 LC3 crawler side frame, distributed in the U.S. by Komatsu of Atlanta, Ga. The crawler side frames 14 are spaced apart and supported by a car body on which is mounted an engine 16 and generator 18. Also mounted on the car body is an electric driven hydraulic motor and pump with tank 20. The width of the crawler with the two side frames and the car body is approximately 17 feet and the length is approximately 16½ feet. The engine 16 drives the generator 18. Electric motors drive the hydraulic pump for the crawler propelling mechanism and the oscillation feeder plate.

Two upper side frames are mounted on the car body for supporting the conveyor. Each upper side frame consists of two sets of I-beams pinned together. The longer I-beam 22 is pinned to the car body at 30 and pinned at the top to the conveyor at 26. The shorter I-beam 28 is pinned at the lower end of the longer I-beam 22 at 24 and pinned at the top to the conveyor at point 32 which is approximately midway of the length of the conveyor. The longer and shorter I-beam form an L with the feeder conveyor and operate as a unitary member permitting the feeder conveyor to pivot about the car body at pin 30. The amount of pivot is controlled by an adjustable hydraulic cylinder 34 which causes the feeder conveyor to pivot about pin 30. The long I-beam 22 is approximately 16 feet long and the short I-beam 28 is approximately 9 feet long.

The mobile feeder loader 10 has a feeder portion at its lower end which feeds the material onto an inclined conveyor which elevates the material to sufficient height so that it may fall off the end of the conveyor into a truck or other receiver 36. The receiver could be another conveyor or other type of receiver but normally would be an end dump or rock truck. These trucks are usually huge and normally 50 to 100 tons but may vary from 35 tons to 220 tons and may even be smaller or larger than this range. The flexibility of the present invention permits a variety of receivers to be loaded having different capacities as no matter what the capacity they can be optimally loaded. The previous arrangement would require an attempt to size the front end loader, electric shovels or hydraulic shovels to the size of the truck and such arrangements were relatively inflexible.

With reference to FIG. 1, the feeder part of the feeder loader is located at the lower most left portion. First is a lip 38 which rests on the ground during normal operation with an inclined forward most face 40 which rises approximately 45 inches tall. Just to the right of the inclined face 40 is a feeder plate 42 which oscillates transversely approximately 12 inches. The oscillation is done by hydraulic cylinders 44 mounted underneath the plate. The cylinders are two way and automatically reverse at the end of the one foot stroke. Four cylinders are utilized, two on each side to reduce the height. The feeder plate 42 is carried on four rails 46 which are welded upside down to the underside of the plate and roll on stationery complementary wheels which are preferably TD25E double flange rollers 48 available from Dresser Industries in Libertyville, Ill. The hydraulic cylinders 44, rails 46 and rollers 48 are better seen in FIG. 3.

With further reference to FIG. 1, there are two feeder sides 50 at each end of the feeder plate 42 under which it oscillates as will be explained more fully infra. There are also two moveable bulkheads 52 to assist in moving the material to be conveyed onto the conveyor. Also, as seen in FIG. 1, the feeder plate 42 is relatively flat and is inclined upward.

The conveyor portion of the apparatus is an inclined trough having inclined conveyor sides 54 with a conveyor at the bottom of the trough carried by chain links 56 on top of rollers 58. For simplicity, only three of many rollers 58 are shown in FIG. 1. The rollers are available from a number of sources, but the ones preferred are the rollers used on the Caterpillar D7 tractor available from Caterpillar Corporation in Peoria, Ill. The chain links are the same as used on the tracks of the same tractor. At the bottom of each conveyor side 54 are replaceable wear plates 60.

The conveyor is partially supported by a number of beams or frames 62 spaced along the side and bottom thereof.

The chain links 56 form a continuous path around drive sprocket 64 and idler sprocket 66. The drive sprocket 64 is driven by a chain 68 which in turn is driven by a gear box and clutch 70. The gear box is a Sumitoma gear box of 380 horsepower rating available from Sumitoma in Houston, Tx. The clutch is an air operated clutch available from Horton Manufacturing Co., Inc. located in Minneapolis, Minn.

The starting and stopping of the conveyor is achieved through the clutch and it is necessary to have a soft start up since there is a large inherent weight inertia associated with the weight of the material on the conveyor. This arrangement for starting and stopping of the conveyor permits the conveyor and feeder unit to, in effect, store a large amount of the material to be conveyed so that the truck, or other receiver, can be optimally loaded without delay when ready to receive a full load. Thus the amount of material present on the feeder plate and on the conveyor stores sufficient material or accumulates sufficient material so that it functions as a surge pile or accumulator usually sufficient to fill a truck without any delay once the truck is positioned under the end the conveyor. The gear drive and clutch 70 are driven by an 150 horsepower AC electric motor 72 available from Weg, Rochester, N.Y. There is a duplicate of the electric motor 72 and gear drive and clutch 70 on the opposite side of the conveyor.

The control of the mobile feeder loader 10 and especially the starting and stopping of the feeding and conveying of the material into the truck 36 is under the control of an operator in the cab 74. The cab is mounted above the top of the conveyor and gives excellent visibility for controlling the mobile feeder loader. The cab is accessible by a ladder 76 from a catwalk (not shown) on the side of the conveyor. An auxiliary or lower cab 75 is provided for moving the feeder loader's position from one location to another. The location of this cab on the mobile base 12 avoids the need for rollover protection for cab 74 since that cab would not normally be used by the operator for repositioning of locations.

As seen on the left of FIG. 1, a bulldozer blade 78 pushes the material 80 up the inclined face 40 of the lip 38 and onto the inclined feeder plate 42. The width of the feeder is slightly greater than the width of the blade of the bulldozer. The material spills over the top part of the inclined face 40 onto the feeder plate 42 and, when desired, the 45 inch height of material on the front of the inclined face can be also pushed onto the feeder plate by the dozer raising its blade up the inclined face 40 as it is pushing the material onto the feeder plate.

The dozer would normally push somewhere between 20 and 40 yards, depending upon the size of the dozer, onto the feeder area which has the capability of storing 80 to 90 yards. Thus, the feeder area can accumulate anywhere from two of the very largest loads of the largest dozers pushed thereon to four or four and one-half loads of some of the smaller dozers. Thus, the dozer can work continuously. Normally the dozer would have no trouble in pushing 100% of its rated load since it would often be pushing downhill on grades that at times are quite steep. Meanwhile, the trucks on the other end of the feeder loader can be loaded in optimum loading in optimum time. The "gate" or the "bridge" between these functions which is provided by the mobile feeder loader of the present invention to keep both the dozers and trucks moving potentially at their ultimate efficiency with the conveyor starting and stopping between each truck load. Normally two dozers would be used to push material onto the feeder loader alternatively with one another at any given time. The angle of the feeder plate 42 and the conveyor is approximately 1 feet of rise for each 2 feet of horizontal length.

Figure 2:
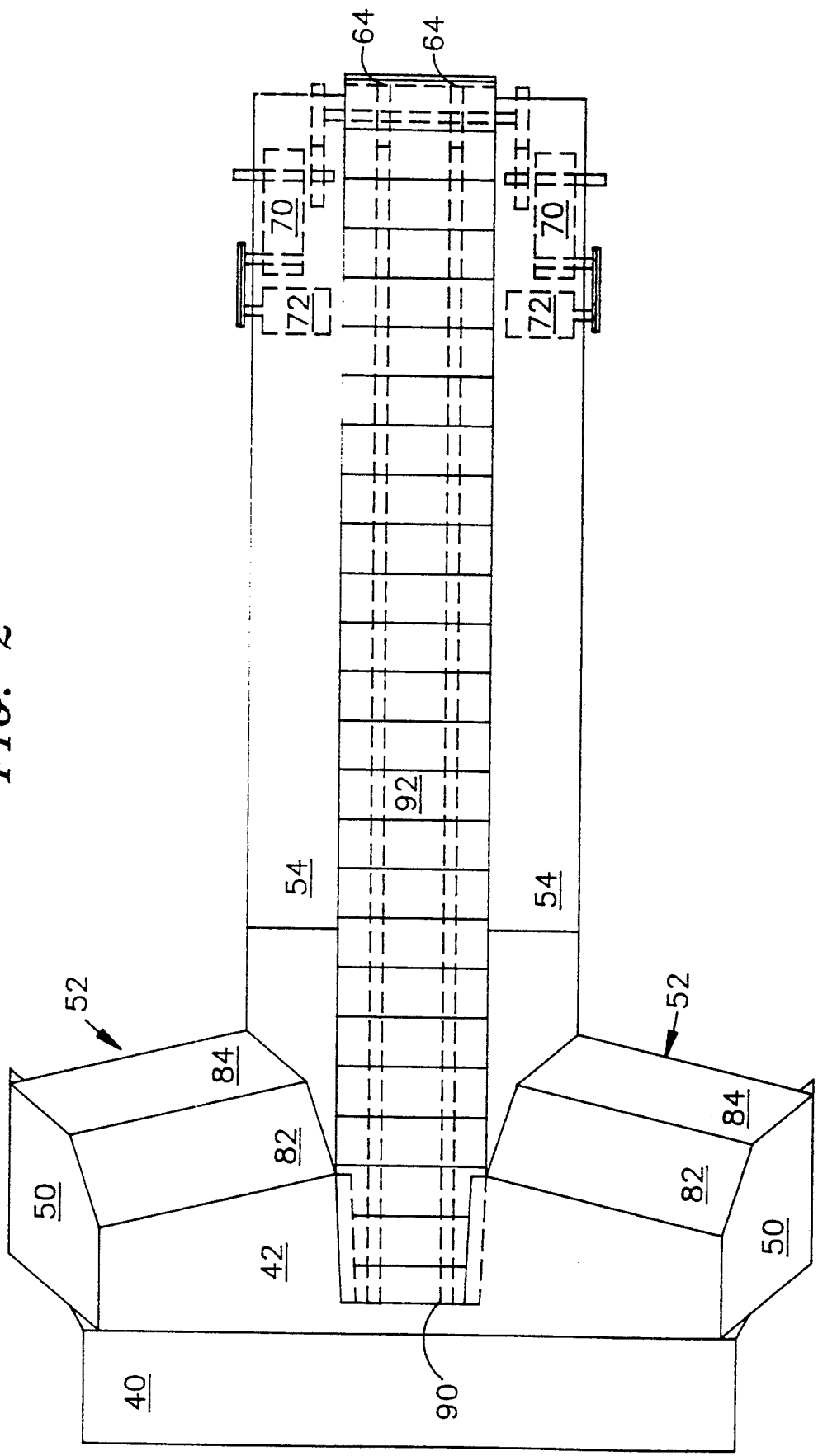
FIG. 2 is a schematic plan view of the invention.

With reference to FIG. 2, there is shown a plan view of the feeder loader in schematic form. The inclined face 40 dumps onto the feeder plate 42 which oscillates transversely under the two feeder sides 50. The figure is somewhat of an optical illusion because of the various angles with this type of view but each side can be viewed as angled outwardly with the shade lines in the figure being parallel to the conveyor. Meanwhile, each moveable bulkhead 52 slide above the feeder plate 42 and is divided into a lower section 82 which is of a smaller angle to the feeder plate than the upper section 84 which has a steeper angle as can be seen in FIGS. 1 and 4. The removable bulkhead are supported on the underside of each bulkhead by two I-beams 86 which serve as rails that ride on two rollers 88 for each I-beam. This is best seen in the schematic side view of FIG. 4 where the moveable bulkhead is shown in solid lines in its most downward position and in dotted lines in its most upward position. The I-beams and rollers are not shown in plan view but are located just above the feeder plate 42 shown in dotted lines in FIG. 3.

As the dozer blade pushes material into the feeder area the material pushes against the moveable bulkheads which ride on the rails up the rollers to their upward position. As material is fed from the feeder plate into the conveyor, the moveable bulkheads 52 move by gravity from their upper dotted line position of FIG. 4 down the rollers 88 to their lower position. The clearance between the bottom of the moveable bulkhead 52 and the feeder plate 42 may be from 1½ inches to actually rubbing. The moveable bulkhead permits substantially the entire feeder plate to be cleared of material which is especially important as cutting down on the cleanup time involved at the end of a shift especially when there is only one shift.

As is seen in FIG. 2, the feeder plate 42 has a notch 90 located over the conveyor 92. The notch runs 83% of the full height of the feeder plate and has a width at its top slightly less than the conveyor width 92 present in the trough of the conveyor. The width of the notch in its lower position narrows down to slightly less than the upper width. The feeder plate oscillates transversely or to the left and right of FIG. 2 approximately 12 inches from the solid line position to the dotted line position and back. These oscillations are at the rate of about 10 full cycles per minute. The transverse oscillation of the feeder plate 42 causes the notch opening to shift back and forth over the conveyor dropping the material from the plate through the notch onto the conveyor. As can be appreciated, when the feeder plate moves to the left and slides from underneath the right sidewall 50, the space left between the sidewall and the material will fill in so as the feeder plate moves back to the right the material that is filled in causes the material on the feeder plate to be pushed left and into the notch. The same would occur on the left side. Meanwhile, as material is being removed from the feeder plate, the moveable bulkheads 52 move downward under gravity to a lower position to assist in gathering and pushing the load of material on the feeder plate down to the lower position so that it can be more readily moved to the center notch for dropping onto the conveyor.

Figure 3:
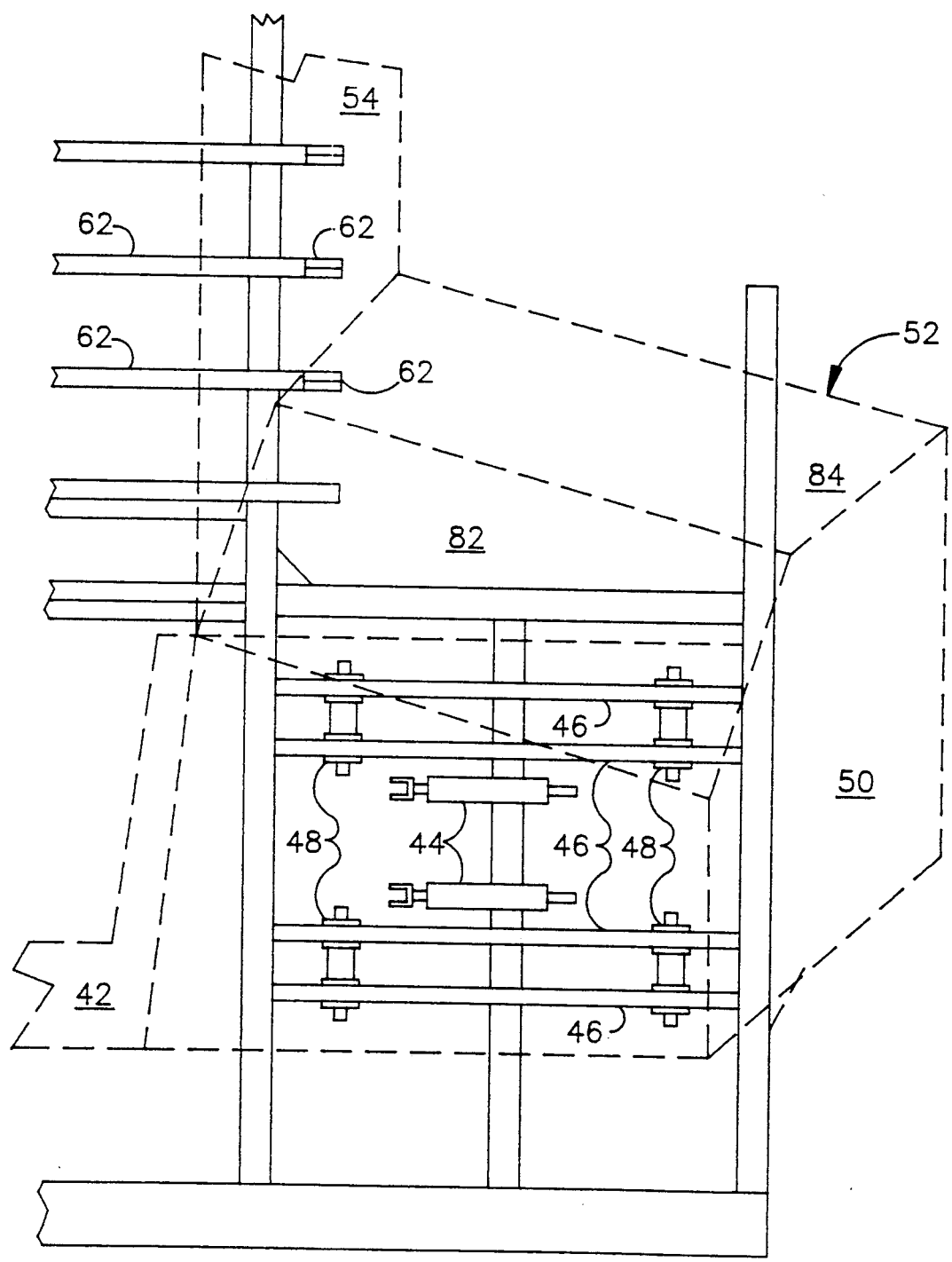
FIG. 3 is a broken away, partial plan view of part of the lower right corner of the invention showing the drive arrangement for the oscillation feeder plate which is shown in dotted lines.
Figure 4:
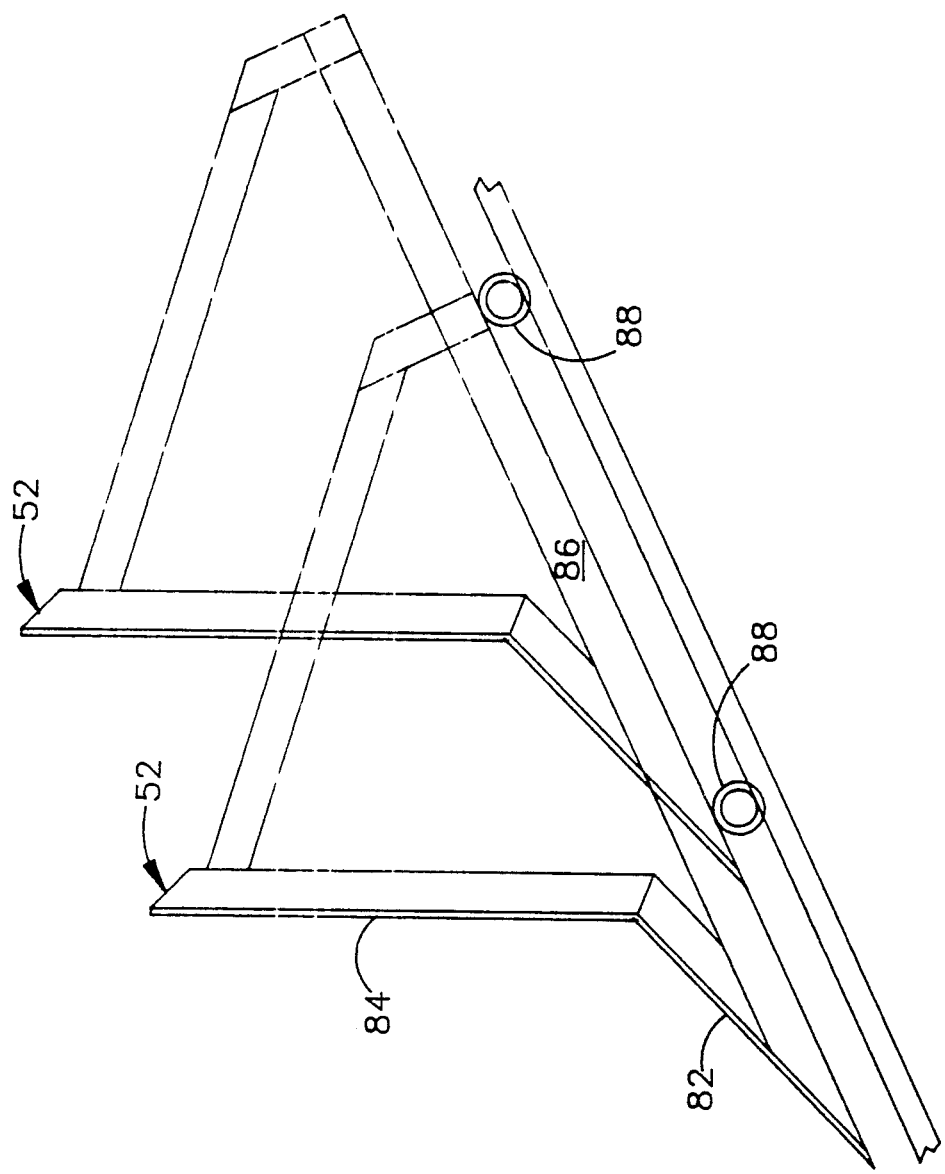
FIG. 4 is a schematic side view of one of the moveable bulkheads in its lower and upper position.

The support for the feeder plate 42 can be seen in FIG. 3 where the plate is shown in dotted lines that move under both the sidewall 50, or feeder sides 50, and the moveable bulkhead 52. The feeder plate is a steel plate approximately 1 inch thick and rests on the rails 46 which are supported by the rollers 48 and driven to oscillate back and forth by the feeder plate hydraulic cylinders 44.

Figure 5:
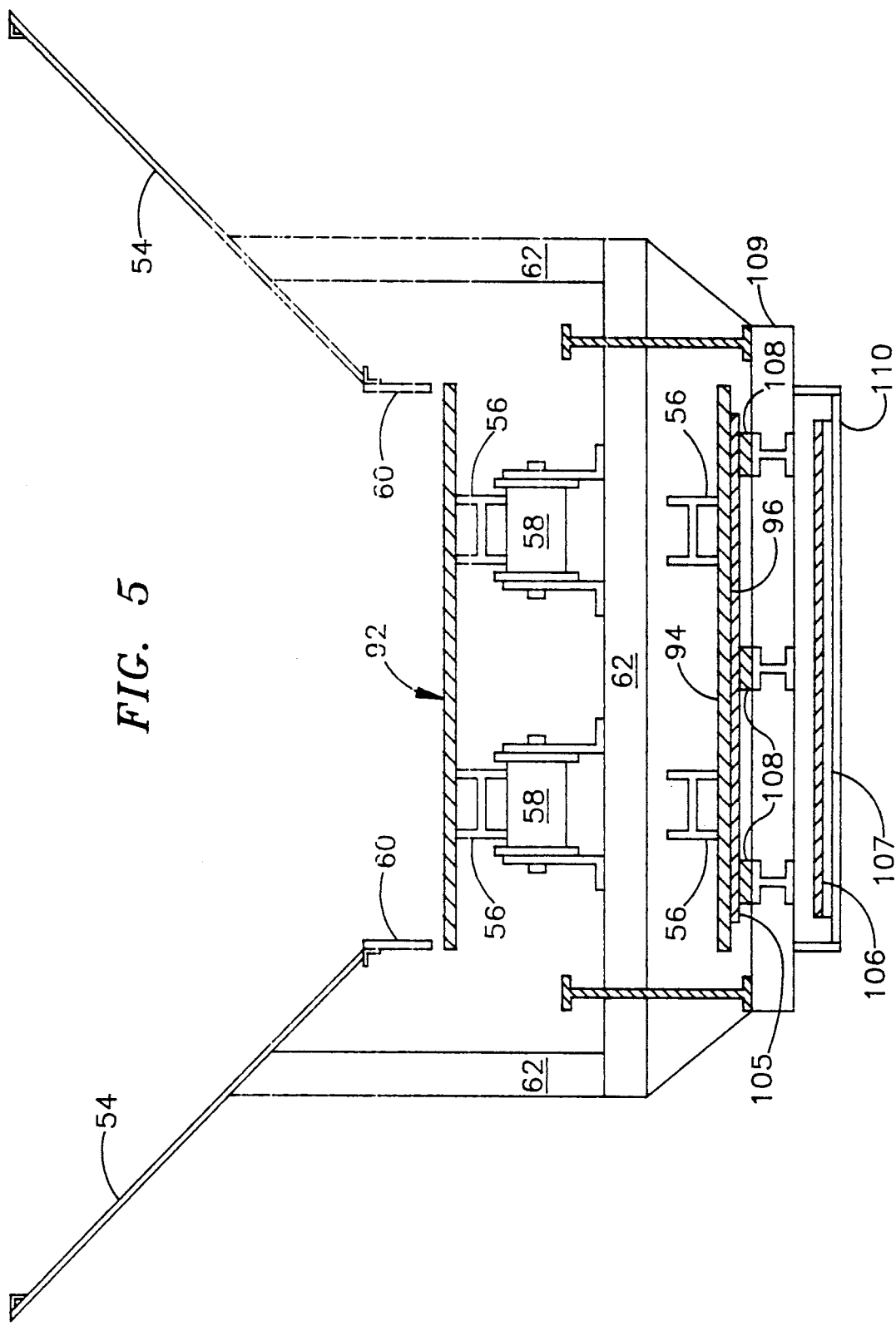
FIG. 5 is a cutaway schematic view of the conveyor.

With reference to FIG. 2 and FIG. 5, the conveyor 92 has two parallel sets of chain links 56 carried by rollers 58 that support the entire length of chain links 56 as described earlier. For simplicity, only three of rollers 58 are shown in FIG. 1. These two parallel chain link groups are bridged transversely by rigid steel flights 94. These steel flights overlap longitudinally with one another as seen in schematic FIG. 6. They are fastened by bolts so that they can be removed for replacement in the event of repair. These flights are not flexible in a transverse direction but are very rigid and uniquely permit the carrying of large, heavy materials such as boulders, ore, overburden and the like. The flights 94 extend under the bottom edge of the bottom replaceable wear plates 60.

The spacing between the conveyor sides 54 at the bottom in the vicinity of the wear plates varies from 72 inches at the lower end to 78 inches at the widest upper end. This is an important feature to improve the economics of the operation of the conveyor and keeps the material from crowding together as it is conveyed upward under normal operations. The material being conveyed by the conveyor may be on the order of 3½ feet deep so that there is a substantial amount of the material in contact with the sidewalls which causes wear of the sidewalls, especially in the vicinity of the replaceable wear plates 60. This is unlike some conveyors where the material is primarily just in the center and is loaded in a manner to be kept from the sides.

The feeder loader 10 usually has the conveyor run at a speed slightly faster than the material that is laid on so that there is no jamming.

Figure 6:
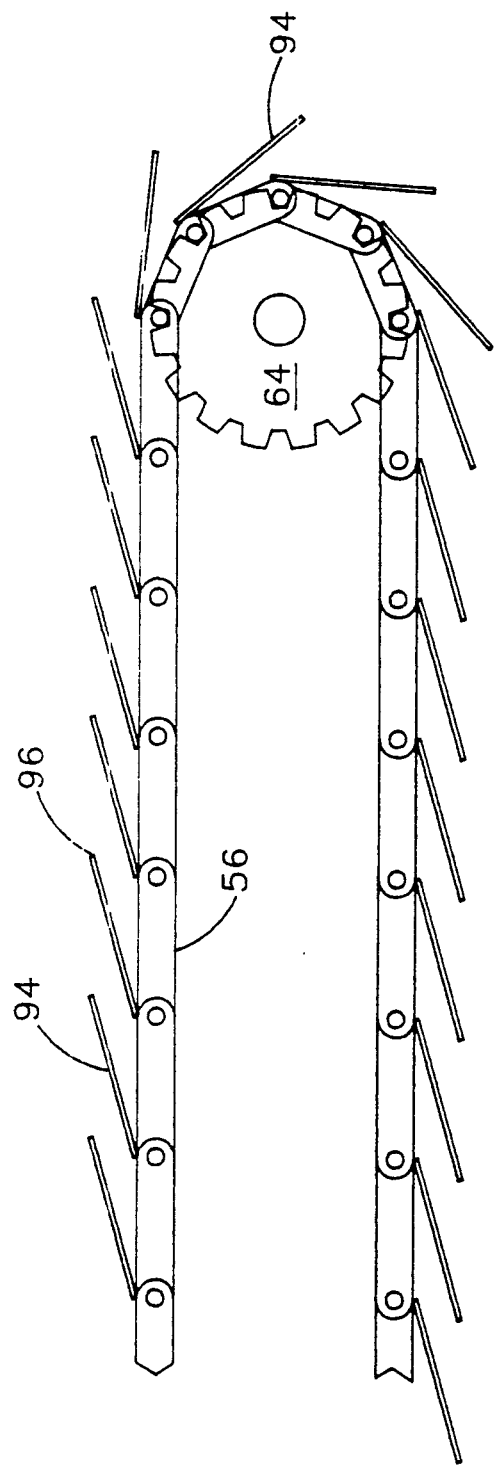
FIG. 6 is a schematic view of the conveyor as it turns on its drive sprocket.

The flights 94 are 78 inches wide, ¾ inch thick and 9½ inches in length with a 1 inch overlap between adjacent flights. The flights each have an upper surface, a forward edge 96 and a rearward edge. Preferably, the upper surface if flat. There is approximately a ¾ inch space between the flights at the overlap which opens up to a maximum opening as the flights go around the end of the conveyor as shown in FIG. 6. The normal design speed is 176 feet per minute for the conveyor which is rapidly achieved from a dead stop with the flights slipping under the load partially to help take up the inertia and prevent shock loading. This occurs because the conveyor is relatively flat and if a huge rock is being conveyed, the likelihood of a single flight taking the full load from such a massive member is reduced by the low heights. The flight edge 96 moves in the direction of the material being conveyed and helps to grip the material being conveyed. When the flights open up as they pass over the end of the conveyor, material caught between the flights will be dropped loose.

Figure 7:
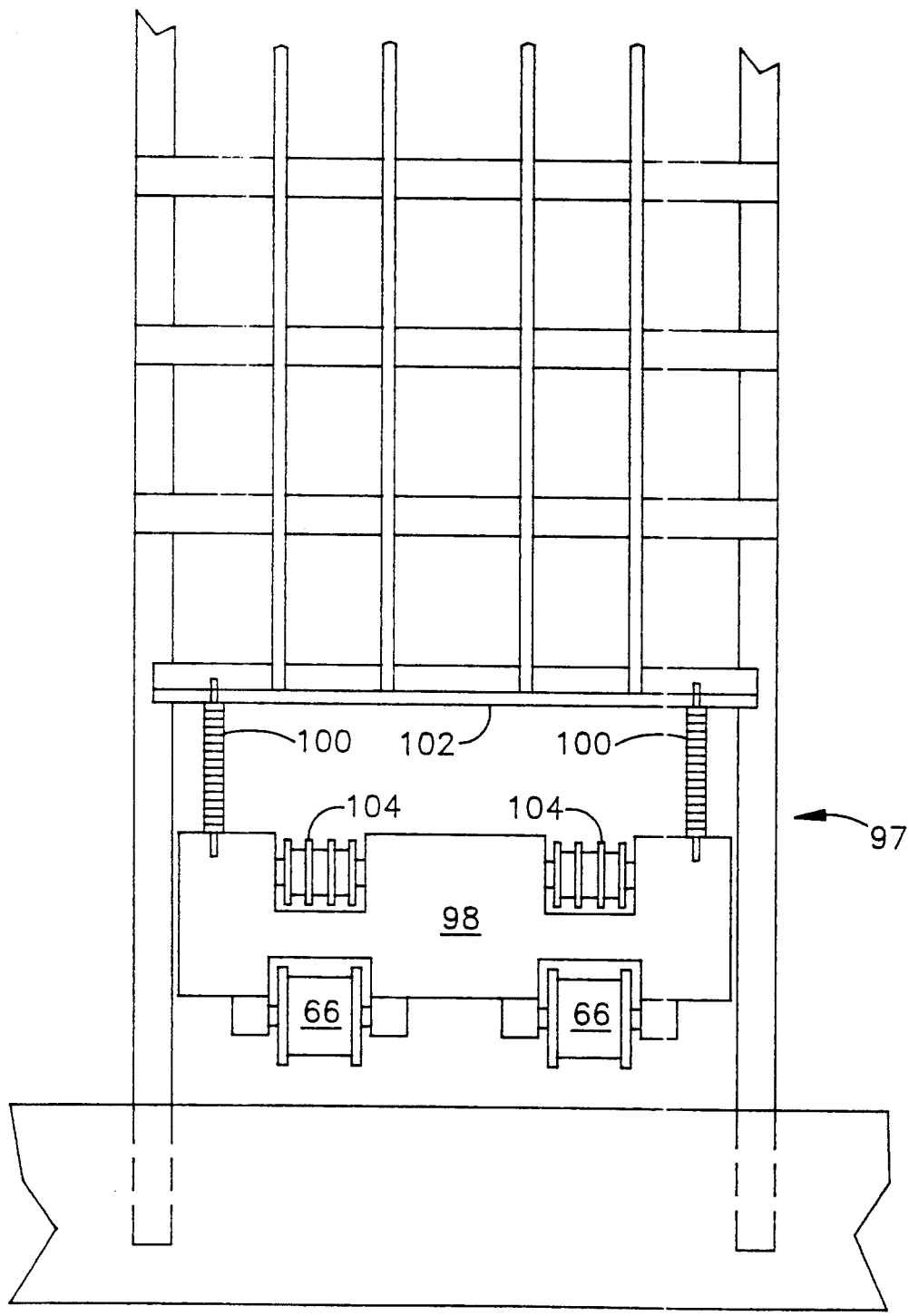
FIG. 7 is a schematic plan view showing the take-up mechanism for the conveyor.

With reference to FIG. 7 there is shown the schematic breakaway plan view of the takeup mechanism 97 for taking up slack in the main conveyor. It consists of a sliding plate 98 which carries 2 idler wheels 66. The sliding plate slides along the frame. The conveyor and chain links have a tendency to pull the idle sprocket 66 and sliding plate 98 to the right. To pick up the slack in the conveyor and chain links, the sliding plate 98 is pushed to the left and held in position by spacers 100 which positively lock the plate 98 in position. The spacers 100 have a central shaft between transverse member 102 and the sliding plate 98. This shaft is free to slide into sliding plate 98 and is adapted to receive a number of horseshoe spacers each ⅛ inch by 3 inches. A hydraulic jack is temporarily placed between the transverse frame member 102 and the sliding frame 98 and sliding plate is jacked to the left until the proper tension is achieved on the conveyor and links. When this is done the proper number of spacers 100 are added to the spacer shaft so when the hydraulic jacks are removed the sliding plate 98 places the spacers in compression which retain the plate in its proper position. Also carried by the plate are two rollers 104 which help support the conveyor chain links.

With reference to FIGS. 1 and 5 there is shown a support belt 105 for carrying the conveyor 92 and rigid steel flights 94 on the return or under side. The support belt is a standard flexible reinforced endless belt that is slightly less than the width of the rigid steel flights 94. As seen in FIG. 1, support belt 105 is looped over idler rolls 112 and 114 at each end of the support belt. The upper supporting side of the support belt is supported by transverse I-beams 109 which in turn support longitudinal beams 108 which run lengthwise under the loaded support belt 105. The longitudinal beams 108 have stainless steel wear strips on the top surface for the loaded support belt 105 to slide over. The return side 106 of support belt 105 is supported from sagging by riding over a number of transverse carrier members 110 which have on their top surface stainless steel wear strips 107. The top surface of support belt 105 is thus held against the return side of conveyor 92 and rigid steel flights 94 to support them. The contact friction of support belt 105 with conveyor 92 causes the support belt to be carried along and support the conveyor 92 during its return movement. There is no separate drive for the support belt and the idler rolls 112 and 114 are free to turn and are not powered.

It is to be understood that the following claims are intended to cover all of the generic and specific features of the invention herein described and it is to be understood that this specific embodiment herein shown is not to be construed in the limiting sense but is merely to depict and illustrate the principles of the present invention. Modifications may be devised by those with skill in the art which will not depart from the spirit or scope of protection as set forth in the following claims.

What is claimed is:

1. A mobile feeder loader comprising:
   a mobile base for entirely supporting said mobile feeder loader having support assemblies that facilitate moving the mobile feeder loader between locations;
   a feed station mounted on said base which is elevatable to a position for movement between locations and lowerable to a stationary ground position to have material pushed thereon by a bulldozer-type vehicle;
   a single straight inclined conveyor having a lower end and an upper end for receiving material from said feed station at said lower end and conveying the material upward until the material falls off of the upper end;
   said feed station having a feed discharge located above said lower end of said conveyor for discharging materials from said feed station onto said lower end of said conveyor;
   said conveyor having spaced apart sidewalls with a bottom edge on each side of said conveyor to define a trough with a lower entrance end and an upper discharge end;
   said conveyor including an endless path of conveyor chain links running from said conveyor lower end to said conveyor upper end;
   an endless rigid conveyor surface comprising overlapping rigid flights each fastened to said chain links to be carried therewith and secured against pivotal movement with respect to said chain links, said flights located between and under the bottom edge of said sidewalls, said flights being sufficiently rigid to carry large heavy materials and non-porous to prohibit material carried thereon to pass through said flights, said overlapping flights each having a forward edge, a rearward edge, and a substantially planar upper surface therebetween, said forward edge of one flight overlapping and protruding above said upper surface of an adjacent flight to provide an exposed abutment surface for assisting the movement of material along the conveyor; and
   a motor for driving said endless path of chain links.

2. The mobile feeder loader of claim 1 wherein
   said bottom edge of said conveyor sidewalls are spaced apart at a closer distance at the lower entrance end than at the upper discharge end.

3. The mobile feeder loader of claim 1, further comprising
   a gearbox driven by said motor;
   a drive connection between said gearbox and said conveyor for driving same; and
   a clutch associated with said gearbox for starting and stopping said conveyor whereby the material on said conveyer may be dumped into a vehicle located under said upper end of said conveyor until said vehicle is full and the conveyor stopped until the full vehicle is replaced with an empty vehicle.

4. The mobile feeder loader of claim 1 wherein
   said overlapping flights on said endless conveyor surface include a space between the flights so that the forward edge of one flight is spaced above both the rearward edge and the upper surface of an adjacent flight with said space increasing as said flights move around the end of said conveyor so as to dump any material caught in the space between the overlap.

5. The mobile feeder loader of claim 1 which includes; an endless support belt for supporting said endless conveyor surface on its return movement.

* * * * *